Aug. 1, 1939.  C. STAUFERT  2,168,247
SPINDLE AND SPINDLE BEARING
Filed Feb. 4, 1939    2 Sheets-Sheet 1
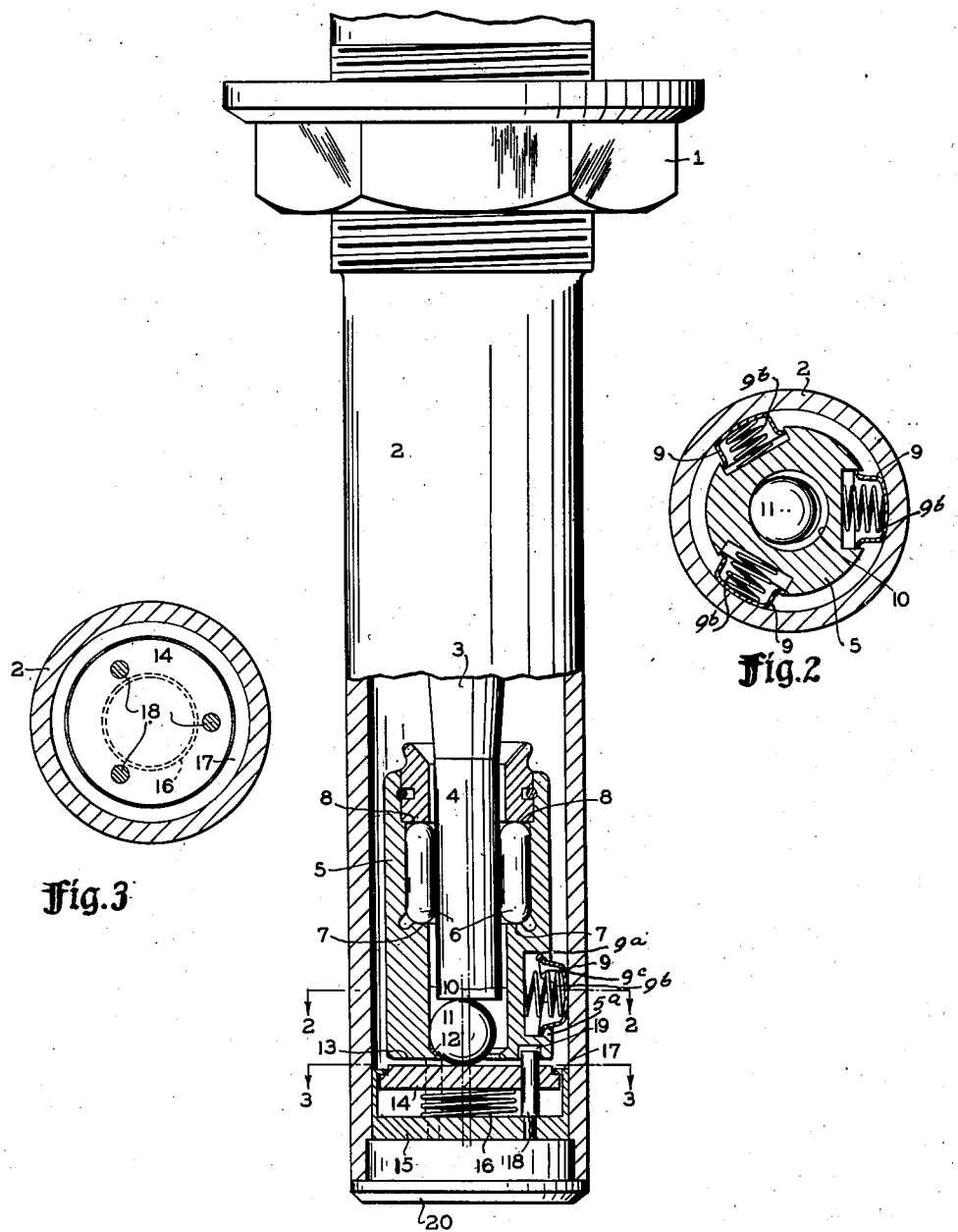
INVENTOR.
CARL STAUFERT
BY
ATTORNEY.

Aug. 1, 1939.　　　C. STAUFERT　　　2,168,247
SPINDLE AND SPINDLE BEARING
Filed Feb. 4, 1939　　　2 Sheets-Sheet 2
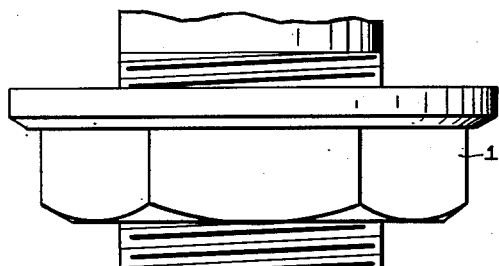
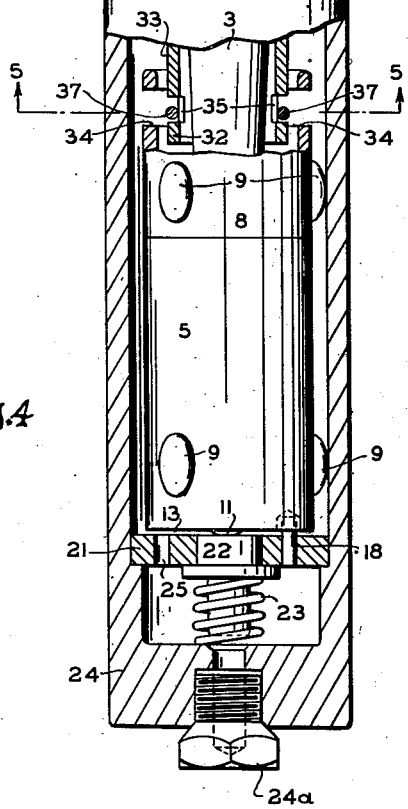
Fig.4
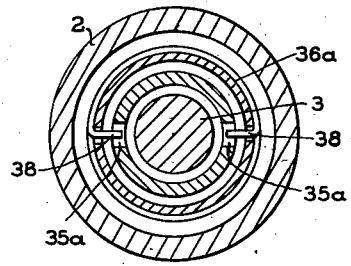
Fig.6
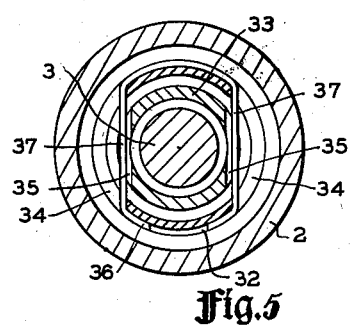
Fig.5
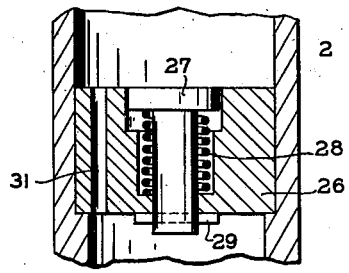
Fig.7
INVENTOR.
CARL STAUFERT
BY
　　George M. Soule
　　　ATTORNEY.

Patented Aug. 1, 1939

2,168,247

UNITED STATES PATENT OFFICE 2,168,247

SPINDLE AND SPINDLE BEARING

Carl Staufert, Stuttgart-Bad Cannstatt, Germany

Application February 4, 1939, Serial No. 254,645
In Germany February 8, 1938

6 Claims. (Cl. 308—152)

This invention relates to an improvement in a bearing construction for shafts which are required to be turned at high speed, and specifically to a footstep bearing for a high speed spindle such as used in the textile industry in vertical or slightly inclined positions. For convenience, but without intent to limit the use of the invention in any way, the invention will be described as embodied in a spinning spindle.

Spinning spindles, commonly, are provided with roller or needle bearings as upper or collar bearings; but, usually at least, the bearing for the lower end of the spindle (footstep bearing) is merely a socket whose principal function is to take end thrust imposed by the weight of the spool and strand material thereon. The collar bearing takes most of the required radial load,— being usually located substantially in the region of application of the driving band to the spindle—, but nevertheless it is desirable so to make the footstep bearing that it can operate effectively to take also radial loads, notwithstanding turning of the spindle at very high speed. The practical conditions have not heretofore been met in proposed constructions using ball and other types of so-called antifriction bearings. Rollers of cylindrical shape in such prior constructions were so arranged that after continuous running for long periods the necessary line contact was not maintained, causing the rollers to lose their cylindrical shape. Balls did not afford sufficient bearing contact area for high speed use over long periods and required too frequent lubrication for practical use, even at lower speed. The expedient of mounting the collar and footstep bearings in a common support or bolster tube so that as the spindle oscillates the two bearings theoretically must swing together and remain concentric would seem to be a solution to the difficulty encountered in the use of rollers or needle bearings for the footstep; but such construction increases unduly the weight and expense of the spindle assembly and the tendency for it to oscillate, causing excessive bearing loads and reduction of the life of the bearings. Moreover, due to the closeness of fitting of the rollers or needles between their inner and outer raceways, it is practically impossible originally to align (and/or continuously to maintain alignment of) the upper and lower bearings when so supported in a common bolster tube.

In view of the above, the principal object of the present invention is to provide a new arrangement for using antifriction elements for the footstep, which elements are adequate to take the required loads at high speed, said arrangement enabling the bearing elements to remain in the necessary relationship to their cooperating parts incident to use at high speed under practical conditions. The above object is accomplished in part by making a roller bearing unit which is insertable into the fixed support or bolster case of the spindle assembly and elastically supported therein in such manner that the upper and lower, i. e. collar and footstep, bearings are enabled to adjust themselves exactly and smoothly to oscillations of the spindle.

Another object is to provide a radially floatable mounting for a footstep bearing in which gliding friction is practically eliminated, but which nevertheless tends to hold the spindle always in the desired centered relation to the bolster case.

A specific object is to provide an elastically supported bearing mounting for a spindle which mounting will not necessitate any positively acting means for holding the mounting in position longitudinally of the spindle.

The manner in which the above objectives are carried into effect will be explained in connection with the accompanying drawings showing exemplary embodiments of the invention. The essential novel characteristics are summarized in the claims.

In the drawings:

Fig. 1 is a fragmentary view, partly in central section, showing the lower portion of a bolster case and spindle and the improved bearing construction in one form; Figs. 2 and 3 are transverse sectional views taken as indicated at 2—2 and 3—3 respectively on Fig. 1; Fig. 4 is a view somewhat similar to Fig. 1 showing certain modifications in an end thrust absorbing support for the spindle and a coupling means for loosely connecting the spindle and the footstep bearing assembly; Fig. 5 is a transverse sectional view as indicated at 5—5 on Fig. 4; Fig. 6 is a view corresponding to Fig. 5 showing a modified coupling means; and Fig. 7 is a central sectional view of the lower portion of a spindle case and a modified base support for the spindle.

Referring first to Figs. 1 to 3, the fixed housing or bolster case 2 can, as usual, be secured as to the spindle rail by a nut such as 1 on the housing. 3 is the lower end of the spindle, which latter can be radially supported in an upper or collar bearing (not shown) in suitable fashion such as will permit the spindle to oscillate about a point situated on the axis of the spindle and in the region of the upper bearing.

The footstep bearing assembly includes a bearing sleeve or tube 5 into which the lower cylindrically formed end portion 3 of the spindle projects and is held centrally of the sleeve by roller or needle bearing elements 6, hereinafter termed rollers. The rollers can be rounded on their ends and held in place against axial movement downwardly as by a flange 7 abutting the rounded ends. A cap for the sleeve which engages the rollers, as at 8, limits the upward movement of the rollers. The rollers can be held in place against falling out when the spindle is withdrawn by a suitable retaining device or by close proximity to each other or by lubricant film thereon.

For resisting any tendency for the footstep bearing to become eccentric to the housing 2, and to dampen lateral movement of the spindle at its lower end, there are provided a series of spring caps or buttons 9 spaced circumferentially as at 120° about the axis of the sleeve 5. A single row of caps is shown in Figs. 1 and 2. However, two or more rows of caps 9 may be used. Fig. 4 shows two rows of caps in regions or planes respectively above and below the rollers 6. As shown in Fig. 1, the cap or button 9 has flared skirt portions 9a in radially outward abutment with relatively overhanging oppositely disposed flange portions 5a adjacent the recess in the sleeve 5, which recess contains the spring 9b. The caps can be inserted into place by springing opposite skirt portions of each cap toward each other and releasing said portions inside respective recesses. As indicated on Fig. 1 the opposite skirt portions can be disconnected from each other, as at 9c, to facilitate pressing together of said opposite portions of the skirt in inserting the cap. The springs and caps are very flexible and rapid in their action in elastically centering the lower end of the spindle in the bolster case, and the spring caps and bearing 5 are self contained.

The weight of the spindle and its load is taken by a steel ball 11 provided between the spindle and fixed casing for it. The ball is so arranged as to adjust itself automatically and eccentrically of the spindle axis so that at all times it will roll and prevent the formation of flat spots on the ball. As shown, the ball is a little smaller than the bore of the sleeve 5 in the region of the ball and a small rim 12 at the bottom of said bore prevents the ball from falling out when the sleeve is lifted out of place. The ball can protrude the necessary distance from the sleeve (about 1/64" beyond bottom surface 13) without touching the rim 12.

The support for the ball can be elastically borne by the fixed housing, through the intermediary of a hardened steel plate 14 on which the ball rides and a spring 16 beneath the plate. The plate is locked against upward movement beyond the position shown by a rim portion 17 on the bottom plate 15 of the housing, which rim portion 17 overhangs the plate 14. The spring 16 functions normally as a shock absorber when a spool is put on the spindle.

To lock the bearing sleeve 5 against rotation in the bolster case 2 while not interfering with lateral movement of the footstep bearing, pins 18, projecting upwardly from the plate 15 and slidably through the cap plate 14, enter sockets 19 which are larger in all directions than the upwardly projecting portions of the pins which can enter the sockets. The plate assembly 14 and 15 can be pressed into the housing 2 from either end and held by a locking plate 20 if pressed in from below.

In all positions of the spindle the ball adjusts itself automatically to positions eccentrically of the spindle so that it always rolls while being sufficiently aligned with the spindle so as to effectively take the end thrust thereof. Thus the ball stays truly spherical and imposes practically no friction on any part of the assembly.

In mounting the parts, the assembly 14—15 is first inserted as from the bottom end of the housing and then the footstep is inserted until it touches the cap plate. Now, because the caps 9 exercise a braking action on the walls of the casing 2 during insertion of the bearing, the sleeve 5 will spring back to a position slightly spacing the lower end 13 of the sleeve off the cap plate 14 as the caps 9 equalize themselves under the forces applied by the springs of the caps 9 in their retaining sockets. Thus during oscillation of the spindle there is no gliding friction and the only resistance to the oscillation of the spindle is that imposed by the spring caps 9.

Modifications of the spring supported plate for the ball 11 are shown in Figs. 4 and 7. Fig. 4 shows a plate 21 which is pressed into the bolster case 2 and has pins 18 for preventing turning of the sleeve 5. Also the plate 21 has a central hole complementary to a plug 22 on which the ball 11 rides. The plug 22 is shouldered adjacent the hole for the plug and pressed upwardly by a spring 23 bearing at its lower end on the wall portion 24 of the housing 2. An oil passage can be provided by a nipple 24a, principally for drainage and also the plate 21 can have drain holes as at 25. Very little oil is needed for lubrication and this can flow to the interior of the footstep bearing through the space between the plate 14 (or 21) and the end surface 13 of the sleeve 5, from where it climbs the circular walls, including that of the spindle, to the upper or collar bearing.

In Fig. 7 a plate or block 26 is pressed downwardly into the housing 2 and has a central hole to receive a plug 27 which, in turn, supports the ball 11. The plug can be limited in upward movement by a cross key 29 and can be thrust upwardly to acting position by a spring 28 in a socket of the block 26. An oil passage is shown at 31.

Figs. 4 to 6 show the footstep bearing assembly loosely coupled to a depending portion of a collar bearing or bolster sleeve for it so that the footstep bearing may be withdrawn with the collar bearing and inserted into place with it. As illustrated the collar bearing sleeve has a neck 33 which extends loosely into a neck of the sleeve 5. The neck 33 has parallel straight slots 35 and the neck of the sleeve 5 similar but wider slots 34. A wire clamp 37 of generally U-shape with inturned ends 36 embraces the sleeve 5 at the slots thereof as clearly shown in Fig. 5 but without touching the sleeve 33. The clamp may be sprung into place and the loose connection allows either bearing to move freely without placing any load on the other.

In Fig. 6 another shape (C-shape) of spring clamp 36a is shown for the above described purpose, the same having inturned ends 38 lying loosely in openings 35a of the sleeve 5.

I claim:

1. A footstep bearing construction for a rapidly rotating vertical or slightly inclined spindle which is supported in a tubular bolster case or housing having a substantially circular inner wall; said construction comprising a sleeve which receives the lower end of the spindle and provides a lateral bearing for the lower end of the spindle, circumferentially spaced recesses in the outer wall of the sleeve, button members having portions extending from respective recesses for engagement with the circular wall, interengaging means between the buttons and the walls of the recesses for holding the buttons from becoming detached from the sleeve when the latter is removed from the bolster case or housing, and radially acting springs in said recesses and bearing outwardly against the button members.

2. The construction according to claim 1 wherein the recesses are circular sockets with overhanging wall portions, and the button members are hollow caps with skirt portions which are flared outwardly so as to underhang said wall portions, whereby the caps are limited in radial movement against complete detachment from the sleeve when the sleeve is removed from or is being inserted into the bolster case or housing.

3. A footstep bearing construction for a rapidly rotating vertical or slightly inclined spindle which is supported in a bolster case or housing having a circular inner wall, said construction comprising an elongated sleeve which receives the lower end of the spindle, rolling bearing elements having a circumferential raceway inside the sleeve holding the elements against endwise movement, said elements bearing on the spindle, and a plurality of sets of spring pressed cap members disposed in radial sockets formed in the outer wall of the sleeve, adapted and arranged to press outwardly against the wall of the bolster case or housing, one set being above and one below the median plane of the rollers.

4. A footstep bearing construction for a rapidly rotating vertical or slightly inclined spindle which is supported in a bolster case or housing having a circular inner wall, lateral bearing means inside the sleeve for the spindle, means externally of the sleeve arranged yieldingly to engage said circular inner wall from a plurality of radial directions and providing a stabilizing and centralizing support for the sleeve, means providing a substantially flat surface below the sleeve, said spindle having a flat lower end, and a single ball carried in a central bore of the sleeve, which bore is considerably larger than the ball, said ball being borne by said first mentioned flat surface against the flat surface of the spindle end.

5. In a spindle of the class described, a bolster case or housing having an upper bearing for the spindle provided with a depending hollow portion, a footstep bearing disposed below the hollow portion and surrounding at least a portion of the lower end of the spindle, a loose coupling connection between said hollow portion and the footstep bearing, said connection enabling the footstep bearing to move laterally in radial directions independently of said hollow portion as the spindle oscillates, and acting to cause the footstep bearing to be lifted by said hollow portion of the upper bearing when said hollow portion is moved upwardly.

6. A footstep bearing construction for a rapidly rotating vertical or slightly inclined spindle supported in a bolster case having a circular inner wall, said construction comprising a sleeve having means to provide a lateral bearing for the spindle, an anti-friction thrust bearing below the lower end of the spindle and operatively supported by the bolster case, said sleeve being free to move vertically in the bolster case, and yieldable friction members carried by the sleeve and engaging the said circular inner wall normally to suspend the sleeve above its lower limit of movement.

CARL STAUFERT.